United States Patent [19]

Roschger et al.

[11] Patent Number: 5,582,621
[45] Date of Patent: Dec. 10, 1996

[54] BULK DYEING OF PLASTICS

[75] Inventors: Peter Roschger, Köln; Stephan Michaelis, Odenthal; Hauke Fürstenwerth, Leverkusen, all of Germany

[73] Assignee: Bayer Aktiengesellschaft, Leverkusen, Germany

[21] Appl. No.: 527,473

[22] Filed: Sep. 13, 1995

[30] Foreign Application Priority Data

Sep. 20, 1994 [DE] Germany .......................... 44 33 438.9

[51] Int. Cl.$^6$ .............................. C08K 5/46; C09B 23/01
[52] U.S. Cl. .................... 8/506; 8/508; 8/512; 8/516; 8/663; 8/637.1; 8/657; 8/938; 106/498; 106/497
[58] Field of Search ................... 8/637.1, 657, 663, 8/938, 506–512, 516; 106/498, 499

[56] References Cited

U.S. PATENT DOCUMENTS

| | | |
|---|---|---|
| 3,655,670 | 4/1972 | Oberauroff et al. . |
| 4,304,908 | 12/1981 | Frishberg et al. . |

FOREIGN PATENT DOCUMENTS

| | | |
|---|---|---|
| 2156723 | 7/1973 | France . |
| 1386846 | 3/1975 | Germany . |
| 1392499 | 4/1975 | United Kingdom . |

OTHER PUBLICATIONS

J. J. Krutak, et al., Heterocycles, vol. 21, No. 2, p. 719, (1984).
I. I. Chizhevskaya, et al., Zhurnal Obshchei Khimii, vol. 35, No. 7 English translation, pp. 1282–1285, (1965).

*Primary Examiner*—Margaret Einsmann
*Attorney, Agent, or Firm*—Sprung Horn Kramer & Woods

[57] ABSTRACT

Bulk dyeing of plastics using dyestuffs of the formula (I)

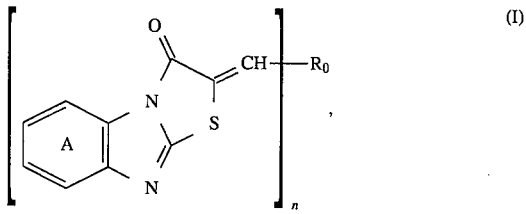

wherein n denotes 1 or 2, preferably 1, $R_o$ for n=1, denotes aryl, hetaryl or heterocyclylidenemethyl, or for n=2, denotes a direct bond or arylene and the ring A is unsubstituted or substituted by $C_1$–$C_4$-alkyl, $C_5$–$C_8$-cycloalkyl, $C_6$–$C_{10}$-aryl, $C_1$–$C_4$-alkyloxy, $C_6$–$C_{10}$-aryloxy, $C_6$–$C_{10}$-aryl- or $C_1$–$C_4$-alkylsulphonyl, cyano, halogen, in particular chlorine or bromine, or a radical of the formula —$COR_1$, wherein $R_1$ represents $C_1$–$C_4$-alkoxy, amino, $C_1$–$C_4$-alkylamino, di-$C_1$–$C_4$-alkylamino, $C_6$–$C_{10}$-arylamino, $C_1$–$C_4$-alkyl or $C_6$–$C_{10}$-aryl, or contains a fused-on aromatic or cycloaliphatic ring, the plastics used being, in particular, thermoplastics, preferably vinyl polymers, polyesters or polyamides.

12 Claims, No Drawings

BULK DYEING OF PLASTICS

The present invention relates to a process for the bulk dyeing of plastics, dyestuffs which are still new in some cases, and a process for their preparation. Bulk dyeing of plastics, for example of thermoplastics, is known, for example, from GB-A-1 386 846 and U.S. Pat. No. 3,655,670.

The disadvantage of the known processes is that the dyestuffs used give only weak yellow (cf. GB-A-1 386 846, U.S. Pat. No. 3,655,670) colour shades.

The present invention relates to a process for the bulk dyeing of plastics using dyestuffs of the formula (I)

$$\left[ \begin{array}{c} \text{(structure with ring A, N, S, N, C=O, CH—R}_0\text{)} \end{array} \right]_n \quad (I)$$

wherein n denotes 1 or 2, preferably 1, $R_o$ for n=1, denotes aryl, hetaryl or heterocyclylidenemethyl, or for n=2, denotes a direct bond or arylene and the ring A is unsubstituted or substituted by $C_1$–$C_4$-alkyl, $C_5$–$C_8$-cycloalkyl, $C_6$–$C_{10}$-aryl, $C_1$–$C_4$-alkyloxy, $C_6$–$C_{10}$-aryloxy, $C_6$–$C_{10}$-aryl- or $C_1$–$C_4$-alkylsulphonyl, cyano, halogen, in particular chlorine or bromine, or a radical of the formula —$COR_1$, wherein $R_1$ represents $C_1$–$C_4$-alkoxy, amino, $C_1$–$C_4$-alkylamino, di-$C_1$–$C_4$-alkylamino, $C_6$–$C_{10}$-arylamino, $C_1$–$C_4$-alkyl or $C_6$–$C_{10}$-aryl, or contains a fused-on aromatic or cycloaliphatic ring.

In a preferred embodiment of the process, dyestuffs of the formula (II)

$$\text{(structure II with ring A, N, S, N, C=O, CH—C(R}_2\text{)=C(R}_3\text{)(R}_4\text{))} \quad (II)$$

wherein $R_2$ and $R_4$ together with the C atoms to which they are bonded form an unsubstituted or substituted $C_6$–$C_{10}$-aromatic, in particular phenyl or naphthyl, or heteroaromatic, in particular an optionally mono- or dibenzo-fused thiophene, furan, pyrrole, thiazole, oxazole, imidazole, pyridine, pyran or pyrimidine radical and $R_3$ represents H, $C_1$–$C_4$-alkyl, halogen, in particular Cl and Br, OH, $C_1$–$C_6$-alkoxy, acyloxy, $C_6$–$C_{10}$-aryloxy, $C_1$–$C_6$-alkylthio, heterocyclic 5- to 7-membered amine, $C_6$–$C_{10}$-arylthio, di-$C_1$–$C_6$-alkylamino or acylamino, where the possible substituents on the ring formed by $R_2$ and $R_4$ preferably have the meaning of $R_3$, or $R_3$ and $R_4$ together with the C atom to which they are bonded form the radical of an unsubstituted or substituted heterocyclic ring, where the possible substituents preferably have the meaning of $R_3$ or correspond to those of ring A, $R_2$ represents H or $C_1$–$C_6$-alkyl and the ring A can be substituted as defined above, are employed.

Acyl here is preferably understood as meaning ($C_1$–$C_6$-alkyl)-CO—, ($C_6$–$C_{10}$-aryl)-CO—, ($C_1$–$C_6$-alkyl)-$SO_2$— or ($C_6$–$C_{10}$-aryl)-$SO_2$.

The two alkyl groups of the dialkylamines can have meanings independent of one another and can be optionally substituted independently of one another.

In a particularly preferred embodiment of the process, dyestuffs of the formula (III)

$$\text{(structure III with ring A, N, S, N, C=O, CH=C—ring E)} \quad (III)$$

wherein the ring A can be substituted in the abovementioned manner and the ring E is unsubstituted or substituted by $C_1$–$C_6$-alkyl, halogen, in particular F, Cl and Br, OH, $C_1$–$C_6$-alkoxy, $C_6$–$C_{10}$-aryloxy, $C_5$–$C_8$-cycloalkyl, acyloxy, di-$C_1$–$C_6$-alkylamino, heterocyclic 5- to 7-membered amine, acylamino, $C_1$–$C_6$-alkylthio or arylthio or contains a fused-on aromatic, heterocyclic or aliphatic 5- to 7-membered ring, are employed.

Dyestuffs of the formula (III) wherein the ring E carries one to three $C_1$–$C_4$-alkoxy radicals independent of one another, which are optionally substituted by Cl, CN, OH, $C_1$–$C_6$-alkoxycarbonyl, $C_1$–$C_6$-alkoxy or acyloxy, or two of the $C_1$–$C_6$-alkoxy radicals are bonded to one another via a methylene bridge, or carries a $C_6$–$C_{10}$-aryloxy radical, in particular a phenyloxy or naphthyloxy radical, which is optionally substituted by $C_1$–$C_6$-alkyl, Cl, Br, $C_1$–$C_4$-alkoxy or alkoxycarbonyl, or carries a di-($C_1$–$C_4$)-alkylamino radical, which is unsubstituted or substituted by Cl, phenyl, CN, OH, $C_1$–$C_4$-alkoxy, di-($C_1$–$C_4$)-alkylamino, $C_1$–$C_6$-alkoxycarbonyl and/or acyloxy, and/or is optionally linked with one or both ortho-positions of the E ring to form a heterocyclic, preferably 5- or 6-membered ring or carries a heterocyclic, preferably 5- or 6-membered amino radical, which preferably contains one or two nitrogen atoms and 0 to 1 oxygen or sulphur atoms as heteroatoms, carries a $C_1$–$C_6$-alkylthio radical, which is optionally substituted by phenyl, OH, acyloxy or $C_1$–$C_4$-alkoxycarbonyl, or carries a phenyl or naphthylthio radical, which is optionally substituted by Cl, $C_1$–$C_6$-alkyl or $C_1$–$C_6$-alkoxycarbonyl and the ring E is optionally further substituted by up to two $C_1$–$C_4$-alkyl groups or halogen atoms, in particular Cl or Br, independent of one another and/or an acylamino, acyloxy or hydroxyl group, are preferably employed.

In a particularly preferred embodiment, the para-position of ring E is substituted by one of the abovementioned alkoxy, aryloxy, alkylthio, arylthio or dialkylamino radicals.

In a especially preferred procedure, dyestuffs of the formula (III) wherein the ring E carries a di-($C_1$–$C_4$)-alkylamino radical, which is unsubstituted or substituted by Cl, phenyl, CN, OH, $C_1$–$C_4$-alkoxy, di-($C_1$–$C_4$)-alkylamino, $C_1$–$C_6$-alkoxycarbonyl and/or acyloxy and/or is optionally linked with one or both ortho-positions of the E ring to form a heterocyclic, preferably 5- or 6-membered ring, or carries a heterocyclic, preferably 5- or 6-membered amino radical, which preferably contains one or two nitrogen atoms and 0 to 1 oxygen or sulphur atoms as heteroatoms, are employed.
Particularly suitable rings E are substituted, for example, as follows:
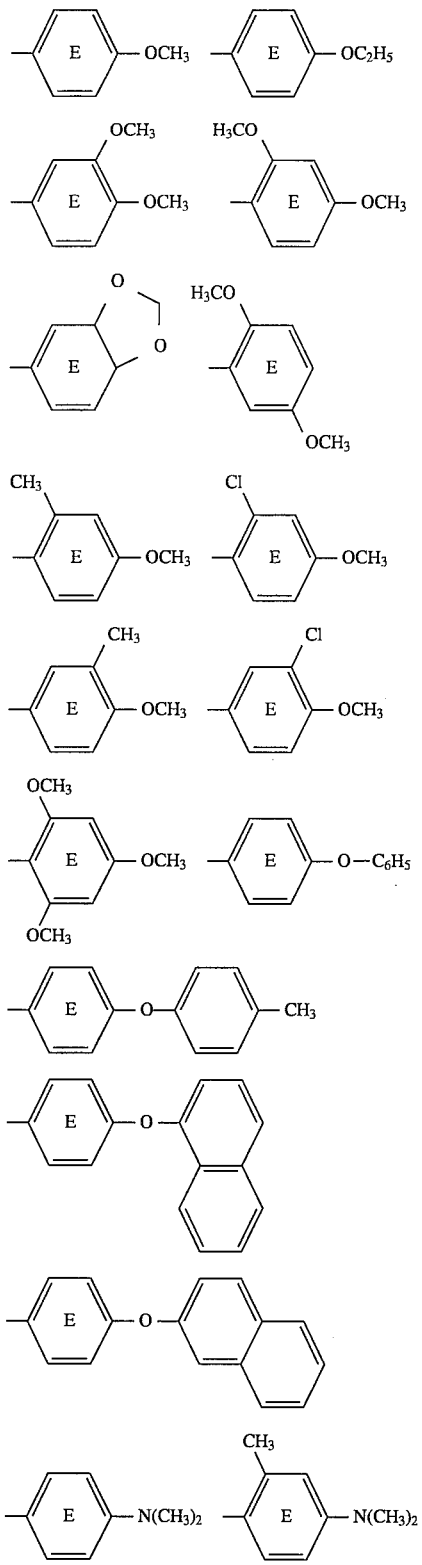
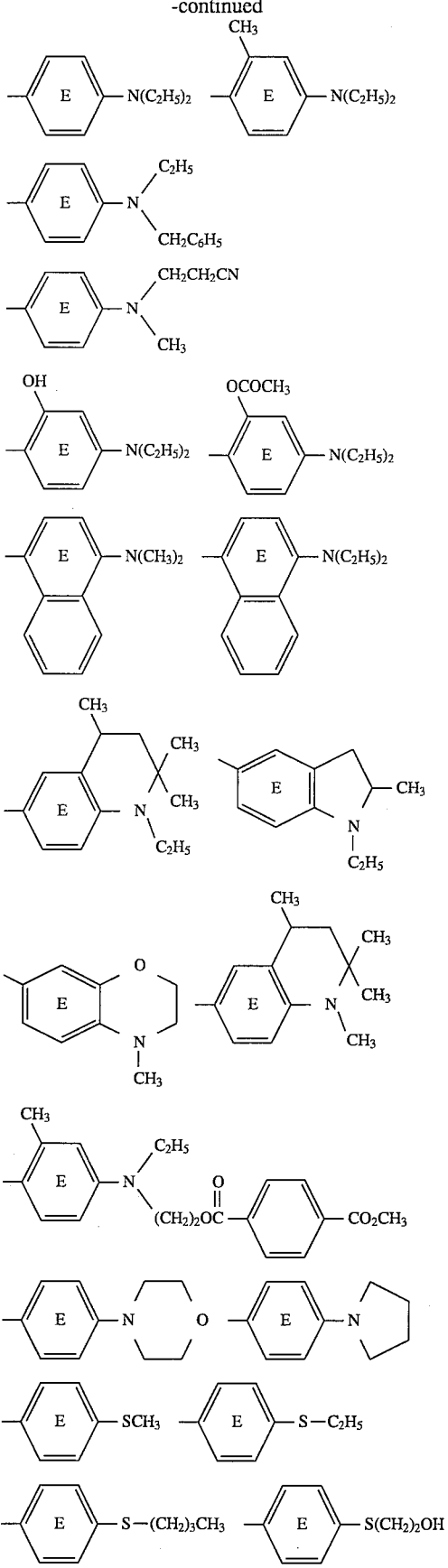

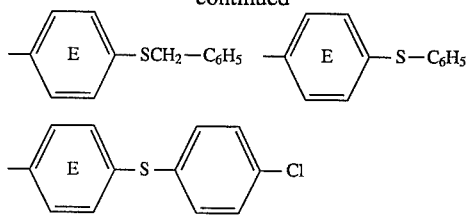

In a further particularly preferred embodiment, dyestuffs of the formula (II)
wherein $R_3$ and $R_4$ together with the C atom to which they are bonded form the radical of an optionally mono- or dibenzo-fused and/or further substituted pyrrole, thiazole, oxazole, imidazole, pyridine, pyran or pyrimidine, and the ring A can be substituted as above and $R_2$ has the above meaning, are employed.

Dyestuffs of the formula (IV)

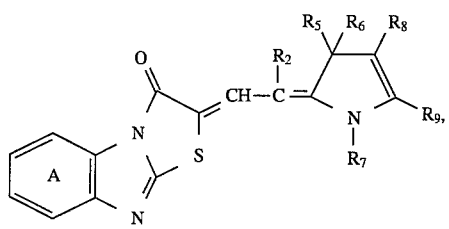

wherein the ring A can be substituted in the above manner, $R_2$ has the above meaning and preferably represents H, $R_5$ and $R_6$ independently of one another represent $C_1$–$C_4$-alkyl, preferably $CH_3$, $C_2H_5$ or $C_3H_7$, or jointly, together with the C atom to which they are bonded, form an optionally substituted carbocyclic 5- or 6-membered ring, preferably together form a tetra- or penta-methylene group, $R_7$ denotes a $C_1$–$C_4$-alkyl group which is unsubstituted or substituted by phenyl, Cl, OH, CN, $C_1$–$C_6$-alkoxycarbonyl, $C_1$–$C_6$-alkoxy, di-($C_1$–$C_4$)-alkylamino or acyloxy and $R_8$ and $R_9$ jointly, together with the C atoms to which they are bonded, form an unsubstituted or substituted benzene or naphthalene ring, preferred substituents which may be mentioned being Cl, $C_1$–$C_4$-alkyl, $C_1$–$C_4$-alkoxycarbonyl and $C_1$–$C_4$-alkoxy, are likewise especially preferably employed here.

Suitable radicals of the formula:

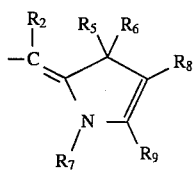

are, for example:

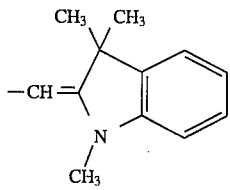

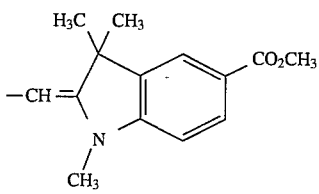

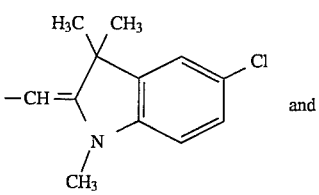

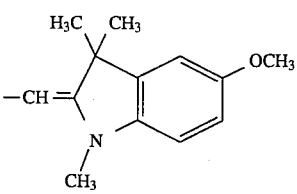

In another embodiment of the process, dyestuffs of the formula (I) wherein n denotes 2 and $R_o$ represents a direct bond or an unsubstituted or substituted $C_6$–$C_{10}$-arylene radical, preferably phenylene or naphthylene, in particular 1,4-phenylene, where suitable possible substituents are preferably the meanings given under $R_3$, but the arylene radical in particular is unsubstituted, and the ring A can be substituted in the abovementioned manner, are used.

In another embodiment of the process, the dyestuffs described above, in particular those of the formula (III) and (IV), wherein the ring A contains an unsubstituted or substituted benzo ring fused on in the 3,4- or 4,5-position, and/or is substituted by 0 to 2 $C_1$–$C_6$-alkyl groups or chlorine atoms independent of one another and/or 0 to 1 $C_1$–$C_4$-alkoxy or $C_1$–$C_4$-alkoxycarbonyl radicals, are preferably used.

The following suitable substitutions on ring A are shown by way of example:

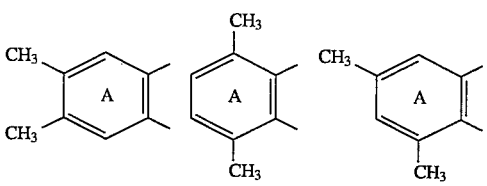

7

-continued

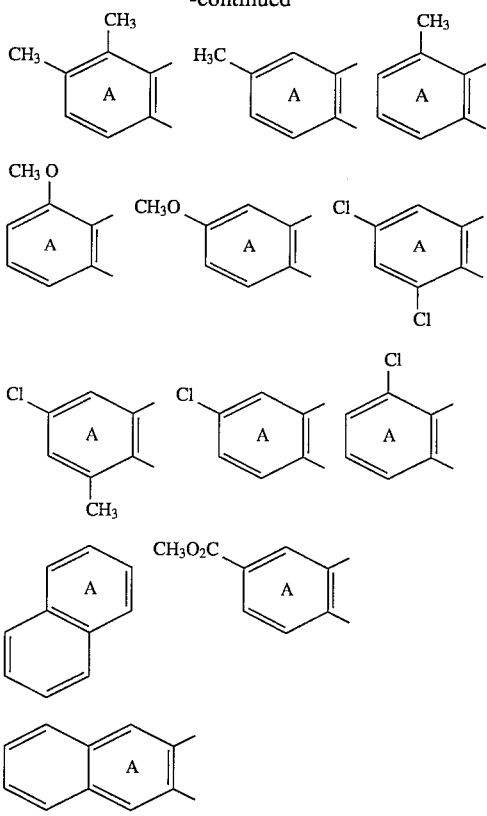

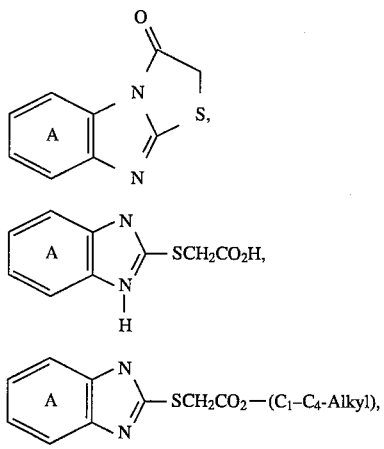

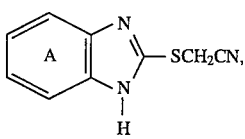

Dyestuffs of the formula (I) are already known in some cases, for example from U.S. Pat. No. 4,304,908; GB 1 392 499; Zh. Obshchei khimi, Volume 35, No. 7 (1965), English translation pages 1281–1285; Heterocycles 21, page 719 (1984).

The invention furthermore relates to a process for the preparation of the dyestuffs of the formula (I), characterized in that a) compounds of the formula

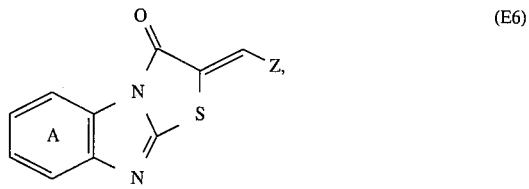

(E1)

(E2)

(E3)

or (E4)

8 wherein the ring A is substituted in the abovementioned manner, are reacted with compounds of the formula $$R_o\text{—CH}=Y \qquad (E5),$$

in which $R_o$ for n=1 or 2, has the above meanings and

Y represents O, $(C_6-C_{10}\text{-aryl})N$, in particular phenyl-N, $(C_1-C_4\text{-alkyl})_2 N^\oplus$, in particular $(CH_3)_2 N^\oplus$, $(C_6-C_{10}\text{-aryl})(C_1-C_5\text{-acyl})N^\oplus$, in particular (phenyl)$(CH_3CO)N^\oplus$, or $(C_6-C_{10}\text{-aryl})(C_1-C_5\text{-alkyl})N^\oplus$, in particular (phenyl)$(CH_3)N^\oplus$, in a solvent or in the melt, if appropriate in the presence of a catalyst, at a temperature of 0° to 250° C., $YH_2$ (and where appropriate $H_2O$, alkyl-OH or $NH_3$) being split off and it being possible, preferably, for the $YH_2$ to be removed by addition of binding agent (for example acetic anhydride) or by means of physical methods (for example by distillation), or b) compounds of the formula

(E6)

in which

Z represents OH, $O(C_1-C_4\text{-alkyl})$, in particular —$OCH_3$, $O(C_1-C_5\text{-acyl})$, in particular O—CO—$CH_3$, Cl, Br, $(C_1-C_4\text{-alkyl})_2 N$, in particular $(CH_3)_2 N$, $(C_6-C_{10}\text{-aryl})NH$, in particular phenyl-NH, $(C_6-C_{10}\text{-aryl})(C_1-C_4\text{-alkyl})N$, in particular (phenyl)$(CH_3)N$, $(C_6-C_{10}\text{-aryl})(C_1-C_5\text{-acyl})N$, in particular (phenyl)$(COCH_3)N$, $NH_2$ or $(C_1-C_4\text{-alkyl})NH$, in particular $CH_3NH$, and $R_2$ and $R_3$ have the meaning given under a)

are reacted with compounds of the formula $$R_o\text{—H} \qquad (E7)$$

if appropriate in a solvent or a melt at a temperature of 0° to 250° C., ZH being split off. It is also advantageous here to add a catalyst and to bind ZH.

The dyestuffs of the formula (I) are obtained in isomerically pure form or in the form of isomer mixtures and can be used in each case for the process according to the invention for bulk dyeing.

The procedure followed is preferably according to preparation variant a) using the compound (E1) or (E2).

Solvents which are generally suitable for the two process variants mentioned are alcohols, such as, for example, ethanol, methanol, propanols, butanols and the like, carboxylic acids, such as, for example, formic acid, acetic acid, propionic acid and the like, esters, for example, ethylacetate, polar aprotic solvents, for example dimethylformamide, N-methylpyrrolidone, dimethylacetamide, dimethyl sulphoxide and the like, aromatics, for example benzene, toluene, xylene, chloro-, dichloro- and trichlorobenzene and the like, ethers, for example tetrahydrofuran, dioxane, methyl t-butyl ether and the like, glycols and ethers thereof, for example mono-, di-, tri- and tetraethylene glycol, propylene glycol, methyl, ethyl and butyl ethers thereof and the like, halogenoaliphatics, for example dichloromethane, dichloroethane and chloroform, phenols, cresols, nitrobenzene and others.

Possible catalysts are acid and basic catalysts.

Acid catalysts which may be mentioned are: carboxylic acids, for example acetic acid, propionic acid, chloroacetic acid, benzoic acid and the like, sulphonic acids, for example toluenesulphonic acid, methanesulphonic acid and the like, inorganic acids, such as, for example, sulphuric, hydrochloric, phosphoric and hydrobromic acid and the like, zinc chloride, aluminium chloride, boron trifluoride and the like.

Suitable basic catalysts are, for example: organic bases, for example amines, such as triethylamine, dialkylamines, piperidine, pyrrolidine, morpholine, N,N-dimethylaniline and the like, alcoholates, for example sodium methylate, potassium t-butylate and the like, carboxylic acid salts, for example sodium acetate or potassium acetate and the like, alkali metal or alkaline earth metal oxides, hydroxides or carbonates, for example sodium hydroxide or potassium hydroxide, calcium oxide, magnesium oxide, sodium carbonate, potassium carbonate, sodium bicarbonate, ammonia, tetrabutylammonium hydroxide and the like.

Suitable condensing agents are, for example, acid anhydrides, such as acetic anhydride, propionic anhydride and the like, and acid chlorides, such as acetyl, propionyl or phosphoryl chloride and the like.

A possible reaction temperature for the preparation processes described under a) and b) is the range from 0° to 250° C., preferably between 15° and 220° C.

The dyestuffs of the formula (I) which are already known can be prepared by processes analogous to the process according to the invention.

Bulk dyeing here is understood as meaning, in particular, processes in which the dyestuff is incorporated into the molten plastic composition, for example with the aid of an extruder, or in which the dyestuff is already added to starting components for the preparation of the plastic, for example monomers, before the polymerization.

Particularly preferred plastics are thermoplastics, for example vinyl polymers, polyesters and polyamides.

Suitable vinyl polymers are polystyrene, styrene/acrylonitrile copolymers, styrene/butadiene copolymers, styrene/butadiene/acrylonitrile terpolymers, polymethyl acrylate and others.

Polyesters which are furthermore suitable are: polyethyleneterephthalates, polycarbonates and cellulose esters.

Polystyrene, styrene copolymers, polycarbonates and polymethacrylate are preferred. Polystyrene is particularly preferred.

The dyestuffs according to the invention are likewise suitable for dyeing thermosetting resins, such as, for example, phenolic resins, urea resins, melamine resins, formaldehyde resins, epoxy resins, resins of unsaturated polyesters, diallyl phthalate and others, and varnishes, for example nitro varnishes, and for dyeing oils, fats, waxes, hydrocarbons and the like of natural or synthetic origin.

The main fields of use, in addition to colouring of plastics, can thus be, for example, shoe creams, floor-polishing waxes, candles, soaps, fuels, lubricating and heating oils, printing inks and varnishes, office requisites, smoke dyestuffs and the like.

The high molecular weight compounds mentioned can be present individually or in mixtures, as plastic compositions or melts.

The dyestuffs according to the invention are brought into finely divided form for use, for which dispersing agents can be, but do not have to be, used in addition.

If the dyestuffs (I) are employed after the polymerization, they are mixed or ground in the dry state with the granules of plastic and this mixture is plasticized and homogenized, for example, on mixing rolls or in screws. However, the dyestuffs can also be added to the melted composition and distributed homogeneously by stirring. The material predyed in this way is then further processed to mouldings in the customary manner, for example by spinning to bristles, filaments and the like or by extrusion or in the injection moulding process.

Since the dyestuffs of the formula (I) are stable towards polymerization catalysts, in particular peroxides, it is also possible to add the dyestuffs to the monomeric starting materials for the plastics and subsequently to carry out the polymerization in the presence of polymerization catalysts. For this, the dyestuffs are preferably dissolved in the monomeric components or mixed intimately with them.

The dyestuffs of the formula (I) are preferably employed for dyeing the polymers mentioned in amounts of 0.0001 to 1% by weight, in particular 0.01 to 0.5% by weight, based on the amount of polymer.

By addition of pigments which are insoluble in the polymers, such as, for example, titanium dioxide, corresponding valuable opaque dyeings can be obtained.

Titanium dioxide can be used in an amount of 0.01 to 10% by weight, preferably 0.1 to 5% by weight, based on the amount of polymer.

Transparent or opaque brilliant, greenish yellow to violet dyeings having a good heat resistance and good fastness to light and weathering are obtained by the process according to the invention.

Mixtures of various dyestuffs of the formula (I) and/or mixtures of dyestuffs of the formula (I) with other dyestuffs and/or inorganic or organic pigments can also be employed in the process according to the invention.

The following examples serve to illustrate the present invention, but without limiting it.

"Parts" are to be understood as parts by weight, unless stated otherwise.

The abbreviations used in the examples have the following meanings:

Me=methyl
Et=ethyl
Ph=phenyl

EXAMPLE 1

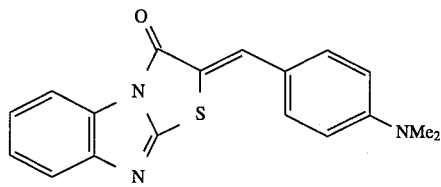

A) Preparation

A mixture of 2.0 g of (2-benzimidazolylmercapto)acetic acid of the formula

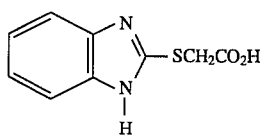

and 1.5 g of 4-dimethylaminobenzaldehyde is heated at 90° C. in 18.5 ml of acetic anhydride and 15 ml of acetic acid for 30 minutes. The precipitate which has formed is then filtered off hot with suction and rinsed with methanol. After drying, 2.4 g of the product of the above formula are obtained. $\lambda_{max}$=442 nm ($\epsilon$=52,000) [$CH_2Cl_2$]

B) Dyeing Examples

Example a)

100 parts of polystyrene granules and 0.02 part of a dyestuff of the above formula are mixed intensively in a drum mixer for 15 minutes. The granules dyed in the dry state are processed on a screw injection moulding machine at 240° C. Transparent yellow sheets of very good light-fastness are obtained. Instead of polystyrene polymer, it is also possible to use copolymers with butadiene and acrylonitrile. If 0.5 part of titanium dioxide is additionally added, deep opaque dyeings are obtained.

Example b)

0.015 part of the dyestuff from Example A) and 100 parts of polymethyl methacrylate are mixed in the dry state and homogenized on a 1-shaft extruder at 230° C. The material emerging from the extruder as a strand is granulated. It can then be pressed to give shapes. A plastic dyed a transparent yellow and having good fastness to light and weathering is obtained.

Example c)

100 parts of a commercially available polycarbonate are mixed in the dry state in the form of granules with 0.03 part of the dyestuff from Example A). The granules dusted in this way are homogenized at 290° C. on a 2-shaft extruder. A transparent yellow dyeing of good light-fastness is obtained. The dyed polycarbonate is discharged from the extruder as a strand and processed to give granules. The granules can be processed by the customary methods of fabrication of thermoplastic compositions.

If the procedure is as described above but with the addition of 1% of titanium dioxide, a yellow opaque dyeing is obtained.

Example d)

0.04 part of the dyestuff from Example A) is mixed in the dry state with 100 parts of styrene/acrylonitrile copolymer and the mixture is homogenized at 190° C. in a 2-shaft extruder, granulated and then pressed to give shapes in a customary manner. A transparent yellow plastic of good light-fastness is obtained.

Example e)

0.025 part of the dyestuff from Example A) is mixed with 100 parts of polyethylene terephthalate of a transparent grade and the mixture is homogenized at 280° C. in a 2-shaft extruder. A transparent yellow dyeing of good light-fastness is obtained. After subsequent granulation, the coloured plastic can be processed by the customary methods of thermoplastic shaping. If the procedure is carried out with addition of 1% of titanium dioxide, an opaque dyeing is obtained.

Example f)

0.05 part of tert-dodecylmercaptan and 0.05 part of the dyestuff from Example A) are dissolved in 98.9 parts of styrene. This solution is dispersed in a solution of 200 parts of desalinated water, 0.3 part of partly hydrolyzed polyvinyl acetate (for example Mowiol® 50/88 from Hoechst) and 0.05 part of dodecylbenzenesulphonate. After addition of 0.1 part of dibenzoyl peroxide in 1 part of styrene, the dispersion is heated to 80° C., while stirring vigorously, and the polymerization is started. If the following polymerization conditions are used: 4 h at 80° C., 2 h at 90° C., 3 h at 110° C., 2 h at 130° C., the polymer is obtained in a yield of 98% of theory. The polymer is obtained in the form of beads which have a diameter of 0.1 to 1.5 mm ($D_{50}$ value), depending on the stirring conditions. The polymer is separated from the serum by filtration and dried at 110° C. to a residual moisture content of 0.5%. After melting in a mixing unit (heated rolls), 0.5% of zinc stearate and 0.2% of ionol are admixed and the polymer is granulated.

The polymer can be processed to give yellow transparent mouldings by the customary methods of thermoplastic shaping, for example in the injection moulding process.

Example g)

0.2 part of tert-dodecylmercaptan and 0.01 part of the dyestuff from example A) are dissolved in 74.8 parts of styrene and 25 parts of acrylonitrile and the solution is then dispersed in a solution of 200 parts of completely desalinated water and 0.2 part of a copolymer of styrene and maleic anhydride and neutralized with sodium hydroxide. After addition of 0.1 part of dibenzoyl peroxide dissolved in one part of styrene, the dispersion is heated to 80° C., while stirring vigorously, and the polymerization is started. After polymerization as in Example f), the mixture is also worked up in the same manner as described in that example. 0.5% of zinc stearate, as a lubricant, and 0.5% of ionol, as an anti-ageing agent, are incorporated on the hot roll. The granulated polymer can be injection moulded to give transparent yellow mouldings.

Example h)

A solution of 99.95 parts of styrene, 0.04 part of the dyestuff from Example A) and 0.01 part of di-tert-butyl peroxide is introduced into a continuously running preliminary reactor operated with an overflow and initial polymerization was carried out at a temperature of 75° C. The initially polymerized solution (polystyrene content 20%) emerging from the preliminary reactor is introduced into a 2-shaft screw unit. The two shafts run in opposite directions at 20 rpm. The four heatable and coolable segments of the screw machine are kept at 110° C., 130° C., 160° C. and 180° C. in the sequence product intake-product discharge. The polymer leaves the screw reactor with a solids concentration of 80%. In a downstream extruder, 3 parts by weight of ionol and 5 parts by weight of octyl alcohol are metered in per 1000 parts by weight of polymer solution, and the polymer is degassed and then granulated. The granules which have been dyed yellow can be processed to give mouldings.

Example i)

0.02 part of the dyestuff from Example A) is dissolved in 74.97 parts of styrene and 25 parts of acrylonitrile or methacrylonitrile. After addition 0.01 part of di-tert-butyl peroxide, the solution thus obtained is introduced into a continuously running preliminary reactor operated with an overflow. The polymerization and working up are carried out as described in Example h). The transparent yellow granules can be further processed to give profiles and sheets by the customary methods of processing of thermoplastic compositions.

Example k)

0.03 part of the dyestuff from Example A) is dissolved in 99.97 parts of methyl methacrylate. After addition of 0.1 part of dibenzoyl peroxide, the solution is heated to 120° C. and the polymerization is started. After 30 minutes, the initially polymerized methyl methacrylate is polymerized completely between two sheets of glass at 80° C. for 10 hours. Yellow transparent polymethyl methacrylate sheets are obtained.

Example l)

100 parts of polyamide 6 chips obtained by polymerization of ε-caprolactam are mixed intimately with 0.05 part of the dyestuff from Example A) in a vibratory machine. The powdered chips thus obtained are melted in an extruder at 260° C., the resulting melt is pressed through a single-hole dye of diameter 0.5 mm and the filament emerging is taken off at a rate of about 25 m/minute. The filament can be stretched 4-fold in hot water. A filament dyed a transparent yellow and having excellent light-fastness is obtained. If an opaque dyeing is required, 0.5 part of titanium dioxide is additionally added.

The residence time in the extruder can be up to 30 minutes without impairment of the colour shade.

Example m)

0.015 part of the dyestuff of the above formula are introduced into a melt of 90 parts of paraffin and 10 parts of stearin at 150° C. and the mixture is stirred for 1 hour. Candles which are dyed an intensive yellow can be cast from the composition by customary processes.

Melts which can be used for immersion dyeing of candles can be obtained analogously to this method but using 0.1 part of dyestuff.

EXAMPLE 2

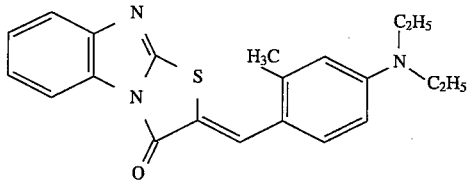

A mixture of 2.0 g of (2-benzimidazolylmercapto)acetic acid, 1.9 g of 4-diethylamino-2-methylbenzaldehyde, 12.5 ml of acetic anhydride and 10.0 ml of acetic acid is heated at 100° C. for 45 minutes. It is then cooled and the precipitate which has formed is filtered off with suction, rinsed with glacial acetic acid and methanol and dried at 50° C. in vacuo. Yield: 2.7 g.

$\lambda_{max}=459$ nm ($\epsilon=47,600$) [$CH_2Cl_2$]

The dyestuff gives strong yellow shades having a good level of fastness when used for dyeing analogously to dyeing Examples 1B).

EXAMPLE 3

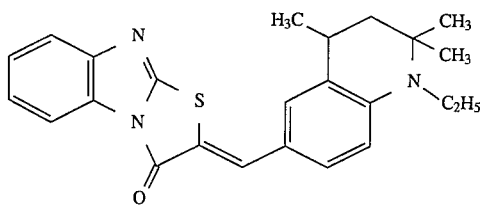

2.0 g of (2-benzimidazolylmercapto)acetic acid, 2.3 g of an aldehyde of the formula

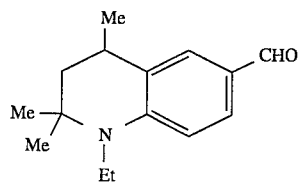

12.5 ml of acetic anhydride and 10 ml of acetic acid are reacted analogously to Example 2. Yield: 3.0 g.

$\lambda_{max}=461$ nm ($\epsilon=56,700$) [$CH_2Cl_2$]

When used for dyeing analogously to dyeing Examples 1B), intensive yellow dyeings are obtained.

EXAMPLE 4

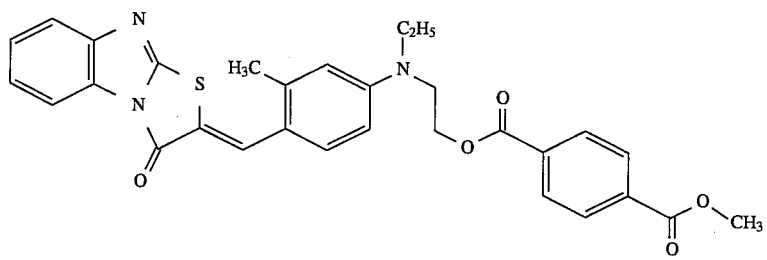

A mixture of 2.0 g of (2-benzimidazolylmercapto)acetic acid, 3.7 g of an aldehyde of the formula

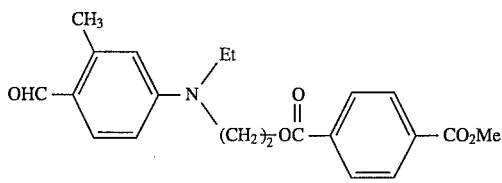

12.5 ml of acetic anhydride and 10 ml of acetic acid was heated under reflux for 1 hour. After cooling, the precipitate is filtered off with suction, washed with glacial acetic acid and methanol, and dried. Recrystallization from toluene gives 3.1 g of the dyestuff of the above formula, which gives intensive yellow shades in accordance with dyeing Examples 1B).

$\lambda_{max}$=447 nm ($\epsilon$=44,600) [$CH_2Cl_2$]

EXAMPLE 5

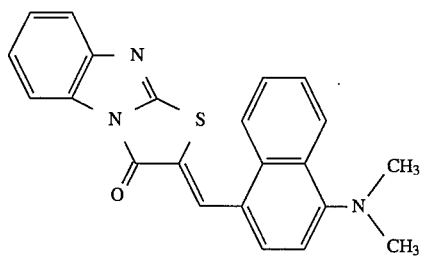

2.0 g of (2-benzimidazolylmercapto)acetic acid and 2.9 g of 4-dimethylaminonaphthalene-1-aldehyde are heated under reflux in 12.5 ml of acetic anhydride and 10 ml of acetic acid for 1 hour. The precipitate is filtered off with suction and washed with glacial acetic acid and methanol. Yield: 2.3 g.

$\lambda_{max}$=434 nm ($\epsilon$=25,200) [$CH_2Cl_2$]

The dyestuff gives yellow shades having good fastnesses when used for dyeing in accordance with Examples 1B).

EXAMPLE 6

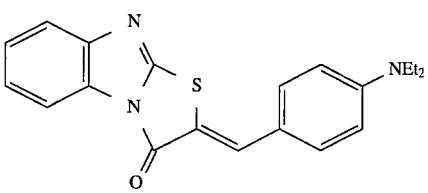

21 g of (2-benzimidazolylmercapto)acetic acid, 17.7 g of 4-diethylaminobenzaldehyde, 10 g of sodium acetate and 200 ml of acetic anhydride are heated under reflux for 2 hours, the mixture is cooled to 70° C., 500 ml of methanol are then added dropwise and the mixture is then cooled to 25° C. The product is filtered off with suction, washed with methanol and dried. Yield: 10.6 g $\lambda_{max}$=448 nm ($\epsilon$=52,900) [$CH_2Cl_2$]

When used for dyeing in accordance with dyeing Examples 1B), the dyestuff gives intensive yellow shades.

EXAMPLE 7

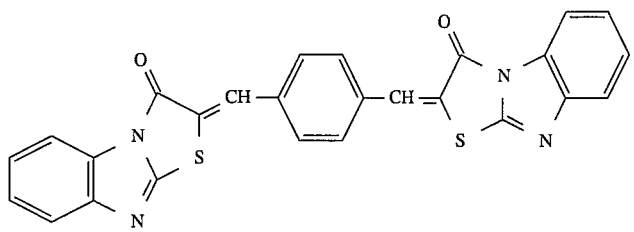

A mixture of 21 g of (2-benzimidazolylmercapto)acetic acid, 6.7 g of 1,4-formylbenzene, 10 g of sodium acetate and 200 ml of acetic anhydride is heated under reflux for 2 hours. It is then cooled and diluted slowly with 500 ml of methanol. The precipitate is filtered off with suction, washed with methanol and dried. Yield: 16.4 g. Purification can be carried out by boiling out with dimethylformamide. When used for dyeing analogously to dyeing Examples 1B), intensive yellow dyeings are obtained.

EXAMPLE 8

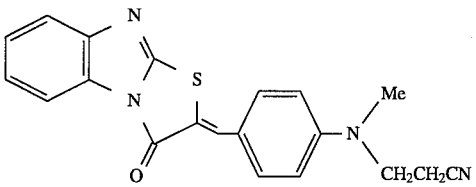

A mixture of 21 g of (2-benzimidazolylmercapto)acetic acid, 20 g of 4-(N-β-cyanethyl-N-methylamino)benzaldehyde, 10 g of sodium acetate and 150 ml of acetic anhydride is heated at boiling for 4 hours. 400 ml of methanol are then added dropwise, the mixture is cooled and the product is isolated by filtration. Recrystallization from dimethylformamide gives 13.2 g.

$\lambda_{max}$=432 nm ($\epsilon$=43,000)

When used for dyeing according to dyeing Examples 1B), the dyestuff leads to yellow products.

EXAMPLE 9

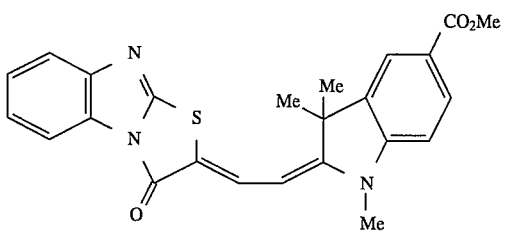

A mixture of 2.0 g of (2-benzimidazolylmercapto)acetic acid, 3.0 g of an aldehyde of the formula

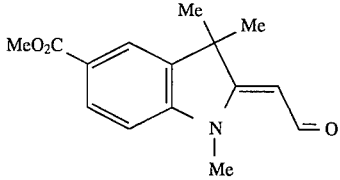

12.5 ml of acetic anhydride and 10 ml of acetic acid is heated at 90° C. for 30 minutes. The precipitate which has formed is filtered off with suction at 70° C., washed with glacial acetic acid and methanol, and dried. Yield 2.8 g $\lambda_{max}$=468 nm ($\epsilon$=68,800) [$CH_2Cl_2$]

When used for dyeing according to dyeing Examples 1B), the dyestuff gives strong yellow shades.

EXAMPLE 10

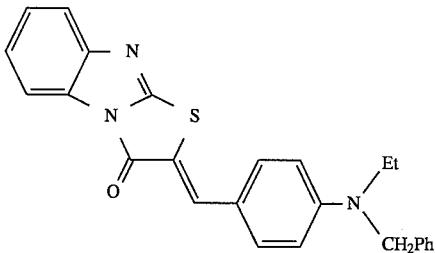

A solution of 2.0 g of (2-benzimidazolylmercapto) acetic acid, 2.4 g of 4-(N-benzyl-N-ethyl-amino)benzaldehyde, 12.5 ml of acetic anhydride and 10 ml of acetic acid is heated at 90° C. for 30 minutes, the product precipitating out. It is diluted with a further 10 ml of acetic acid and the dyestuff is filtered off with suction at room temperature. After washing with acetic acid and methanol, 2.7 g of the dyestuff of the above formula, which gives intensive yellow shades when incorporated into plastics analogously to Examples 1B), are obtained.

$\lambda_{max}$=443 nm ($\epsilon$=53,500) [$CH_2Cl_2$]

EXAMPLE 11

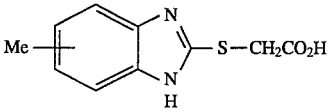

16 kg of x-methyl-2-mercaptobenzimidazole, which is a mixture of the compounds of the formulae

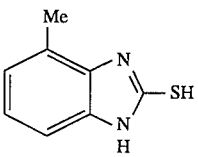

and

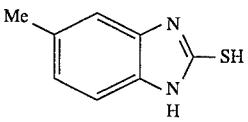

are added to a solution of 94 g of sodium hydroxide in 1 l of water at 50° C., and 100 g of chloroacetic acid are then slowly added (exothermic!). The mixture is subsequently heated under reflux for 30 minutes and cooled to room temperature and the product is precipitated with 150 ml of concentrated hydrochloric acid. The mixture is diluted with 500 ml of water and the product is filtered off with suction. After washing with water and drying in vacuo at 80° C., 172 g of the intermediate product of the above formula are obtained.

EXAMPLE 12

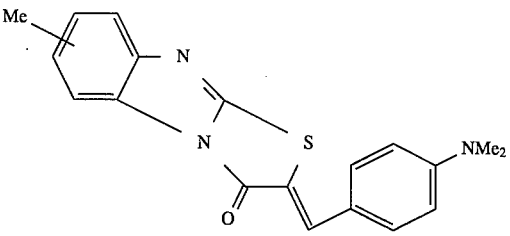

4.44 g of the compound from Example 11 and 2.98 g of 4-dimethylaminobenzaldehyde are subjected to a condensation reaction in a glacial acetic acid/acetic anhydride mixture (20 ml/25 ml) at 90° C. for 30 minutes. The dyestuff is filtered off with suction at 80° C. and washed with glacial acetic acid and methanol. For purification, the crude product can be dissolved in 400 ml of methylene chloride, the solution can be stirred with 4 g of silica gel and filtered and the filtrate can be evaporated in a rotary evaporator.

Yield: 9.0 g.

$\lambda_{max}$=441 nm ($\epsilon$=48,200) [$CH_2Cl_2$]

In accordance with dyeing Examples 1B), this product gives intensive brilliant yellow dyeings in the media stated.

EXAMPLE 13

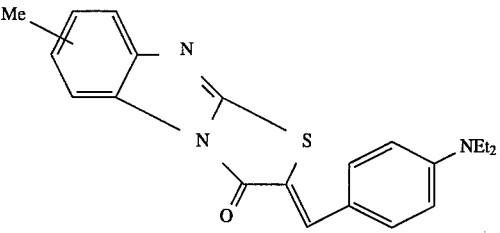

Analogously to Example 13, 3.1 g of the dyestuff of the above formula are obtained employing 3.5 kg of 4-diethylaminobenzaldehyde.

$\lambda_{max}$=450 nm ($\epsilon$=55,100) [$CH_2Cl_2$].

The dyestuff dyes plastics a strong yellow analogously to Examples 1B) and has a good level of fastness.

EXAMPLE 14

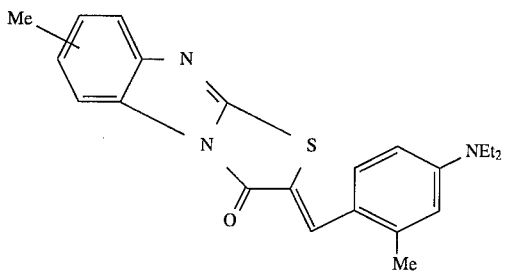

In accordance with the preparation method from Example 12, 2.1 g of the compound of the above formula, which gives intensive yellow shades in plastics analogously to Examples 1B), are obtained using 3.8 g of 4-(N,N-diethylamino)-2-methylbenzaldehyde.

$\lambda_{max}$=457 nm ($\epsilon$=48,400) [$CH_2Cl_2$].

EXAMPLE 15

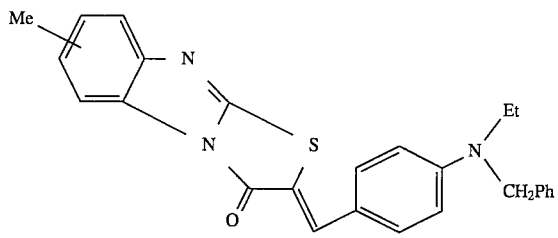

Analogously to Example 12), employing 4.78 g of 4-(N-ethyl-N-benzylamino)benzaldehyde, 4.7 g of this dyestuff are obtained.

$\lambda_{max}$=443 nm ($\epsilon$=52,100) [$CH_2Cl_2$].

When incorporated into plastics by the methods of Examples 1B), the dyestuff gives yellow shades having a good depth of colour and good fastnesses.

EXAMPLE 16

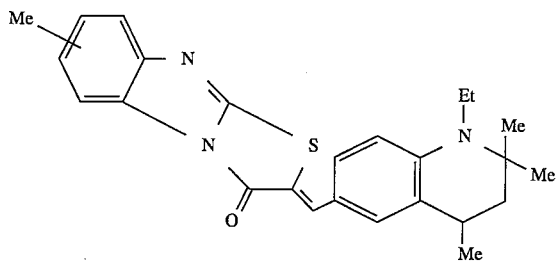

The preparation is carried out analogously to Example 12), 3.62 g of the aldehyde from Example 3) being employed.

Yield: 3.3 g.

$\lambda_{max}$=460 nm ($\epsilon$=56,800) [$CH_2Cl_2$]

The dyestuff dyes plastics in fast yellow shades of good depth of colour and brilliance.

We claim:

1. A process for the bulk dyeing of plastics in which a dyestuff of the formula

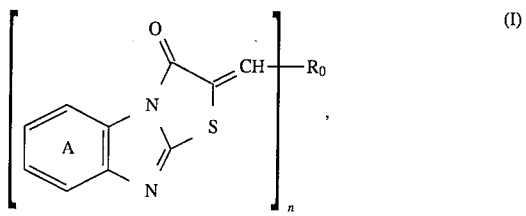

wherein n denotes 1 or 2, $R_o$ for n=1, denotes aryl, hetaryl or heterocyclylidenemethyl, or for n=2, denotes a direct bond or arylene and the ring A is unsubstituted or substituted by $C_1$–$C_4$-alkyl, $C_5$–$C_8$-cycloalkyl, $C_6$–$C_{10}$-aryl, $C_1$–$C_4$-alkyloxy, $C_6$–$C_{10}$-aryloxy, $C_6$–$C_{10}$-aryl- or $C_1$–$C_4$-alkylsulphonyl, cyano, halogen, or a radical of the formula —$COR_1$, wherein $R_1$ represents $C_1$–$C_4$-alkoxy, amino, $C_1$–$C_4$-alkylamino, di-$C_1$–$C_4$-alkylamino, $C_6$–$C_{10}$-arylamino, $C_1$–$C_4$-alkyl or $C_6$–$C_{10}$-aryl, or contains a fused-on aromatic or cycloaliphatic ring, is either a) incorporated into the molten plastic composition; or b) is added to the material subjected to polymerication of the dyestuff.

2. The process according to claim 1, wherein the dyestuff is of the formula

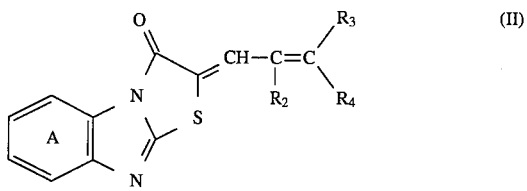

wherein $R_2$ and $R_4$ together with the C atoms to which they are bonded form an unsubstituted or substituted $C_6$–$C_{10}$-aromatic or heteroaromatic radical and $R_3$ represents H, $C_1$–$C_4$-alkyl, halogen, OH, $C_1$–$C_6$-alkoxy, acyloxy, $C_6$–$C_{10}$-aryloxy, $C_1$–$C_6$-alkylthio, heterocyclic 5- to 7-membered amine, $C_6$–$C_{10}$-arylthio, di-$C_1$–$C_6$-alkylamino or acylamino, or $R_3$ and $R_4$ together with the C atom to which they are bonded form the radical of an unsubstituted or substituted heterocyclic ring, $R_2$ represents H or $C_1$–$C_6$-alkyl and the ring A is unsubstituted or substituted by $C_1$–$C_4$-alkyl, $C_5$–$C_8$-cycloalkyl, $C_6$–$C_{10}$-aryl, $C_1$–$C_4$-alkyloxy, $C_6$–$C_{10}$-aryloxy, $C_6$–$C_{10}$-aryl- or $C_1$–$C_4$-alkylsulphonyl, cyano, halogen, or a radical of the formula —$COR_1$, wherein $R_1$ represents $C_1$–$C_4$-alkoxy, amino, $C_1$–$C_4$-alkylamino, di-$C_1$–$C_4$-alkylamino, $C_6$–$C_{10}$-arylamino, $C_1$–$C_4$-alkyl or $C_6$–$C_{10}$-aryl, or contains a fused-on aromatic or cycloaliphatic ring.

3. The process according to claim 2, wherein $R_2$ and $R_4$ together with the C atoms to which they are bonded form an unsubstituted or substituted phenyl, naphthyl, or an optionally mono- or dibenzo-fused thiophene, furan, pyrrole, thiazole, oxazole, imidazole, pyridine, pyran and pyrimidine radical and where the possible substituents on the rings formed by $R_2$ and $R_4$ have the meaning of $R_3$.

4. The process according to claim 1, wherein the dyestuff is of the formula

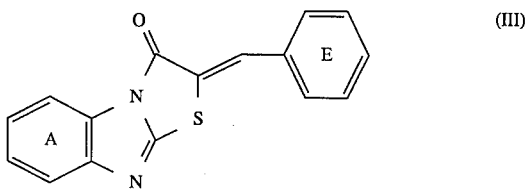

(III)

wherein the ring A is unsubstituted or substituted by $C_1$–$C_4$-alkyl, $C_5$–$C_8$-cycloalkyl, $C_6$–$C_{10}$-aryl, $C_1$–$C_4$-alkyloxy, $C_6$–$C_{10}$-aryloxy, $C_6$–$C_{10}$-aryl- or $C_1$–$C_4$-alkylsulphonyl, cyano, halogen, or a radical of the formula —$COR_1$, wherein $R_1$ represents $C_1$–$C_4$-alkoxy, amino, $C_1$–$C_4$-alkylamino, di-$C_1$–$C_4$-alkylamino, $C_6$–$C_{10}$-arylamino, $C_1$–$C_4$-alkyl or $C_6$–$C_{10}$-aryl, or contains a fused-on aromatic or cycloaliphatic ring, and the ring E is unsubstituted or substituted by $C_1$–$C_6$-alkyl, halogen, OH, $C_1$–$C_6$-alkoxy, $C_6$–$C_{10}$-aryloxy, $C_5$–$C_8$-cycloalkyl, acyloxy, di-$C_1$–$C_6$-alkylamino, heterocyclic 5- to 7-membered amine, acylamino, $C_1$–$C_6$-alkylthio or arylthio or contains a fused-on aromatic, heterocyclic or aliphatic 5- to 7-membered ring.

5. The process according to claim 1, wherein the dyestuff is of the formula

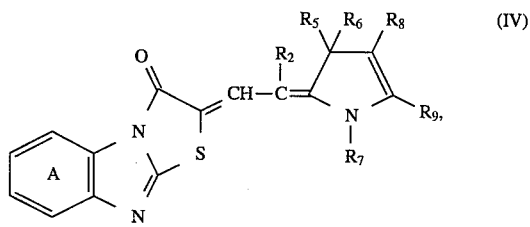

(IV)

wherein the ring A is unsubstituted or substituted by $C_1$–$C_4$-alkyl, $C_5$–$C_8$-cycloalkyl, $C_6$–$C_{10}$-aryl, $C_1$–$C_4$-alkyloxy, $C_6$–$C_{10}$-aryloxy, $C_6$–$C_{10}$-aryl- or $C_1$–$C_4$-alkylsulphonyl, cyano, halogen, or a radical of the formula —$COR_1$, wherein $R_1$ represents $C_1$–$C_4$-alkoxy, amino, $C_1$–$C_4$-alkylamino, di-$C_1$–$C_4$-alkylamino, $C_6$–$C_{10}$-arylamino, $C_1$–$C_4$-alkyl or $C_6$–$C_{10}$-aryl, or contains a fused-on aromatic or cycloaliphatic ring, $R_2$ represents H or $C_1$–$C_6$-alkyl and $R_5$ and $R_6$ independently of one another represent $C_1$–$C_4$-alkyl, or jointly, together with the C atom to which they are bonded, form an optionally substituted carbocyclic 5- or 6-membered ring, $R_7$ denotes a $C_1$–$C_4$-alkyl group which is unsubstituted or substituted by phenyl, Cl, OH, CN, $C_1$–$C_6$-alkoxycarbonyl, $C_1$–$C_6$-alkoxy, di-($C_1$–$C_4$)-alkylamino or acyloxy and $R_8$ and $R_9$ jointly, together with the C atoms to which they are bonded, form an unsubstituted or substituted benzene or naphthalene ring.

6. The process according to claim 5, wherein $R_2$ represents H, $R_5$ and $R_6$ independently of one another represent $CH_3$, $C_2H_5$ or $C_3H_7$, or jointly, together with the C atom to which they are bonded, form a tetra- or pentmethylene group.

7. Process according to claim 1 using a dyestuff of the formula (I) wherein n denotes 2 and $R_o$ represents a direct bond or an unsubstituted or substituted $C_6$–$C_{10}$-arylene radical.

8. Process according to claim 1 using a dyestuff of the formula (I) wherein n denotes 2 and $R_o$ represents a direct bond or an unsubstituted or substituted phenylene or naphthylene radical.

9. Process according to claim 1 using a dyestuff of the formula (I), wherein n denotes 1.

10. Process according to claim 1, wherein the plastic is a thermoplastic.

11. Process according to claim 1, wherein the plastic is a vinyl polymer, polyester or polyamide.

12. Plastics dyed according to the process of claim 1.

* * * * *